(12) United States Patent
Diez et al.

(10) Patent No.: US 7,490,835 B2
(45) Date of Patent: *Feb. 17, 2009

(54) AT LEAST SUBSTANTIALLY METALLIC CYLINDER HEAD GASKET

(75) Inventors: Armin Diez, Lenningen (DE); Tobias Gruhler, Pfullingen (DE); Wolfgang Fritz, Metzingen (DE)

(73) Assignee: ElringKlinger AG, Dettingen (DE)

( * ) Notice: Subject to any disclaimer, the term of this patent is extended or adjusted under 35 U.S.C. 154(b) by 664 days.

This patent is subject to a terminal disclaimer.

(21) Appl. No.: 10/773,704

(22) Filed: Feb. 6, 2004

(65) Prior Publication Data

US 2004/0160017 A1  Aug. 19, 2004

Related U.S. Application Data

(63) Continuation of application No. 10/052,468, filed on Jan. 23, 2002, now Pat. No. 6,769,696.

(30) Foreign Application Priority Data

Sep. 29, 2001 (DE) ................................ 101 48 295
Dec. 6, 2001 (EP) ................................ 01128978

(51) Int. Cl.
   *F02F 11/00* (2006.01)
(52) U.S. Cl. ...................... 277/593; 277/595
(58) Field of Classification Search .......... 277/593–595
   See application file for complete search history.

(56) References Cited

U.S. PATENT DOCUMENTS 4,739,999 A * 4/1988 Ishii et al. ................... 277/595
5,269,541 A   12/1993 Inamura ..................... 277/595
5,427,389 A * 6/1995 Ishikawa et al. ............ 277/595
5,626,348 A * 5/1997 Takada et al. ............... 277/593
5,961,126 A * 10/1999 Miyaoh ...................... 277/594
6,036,195 A   3/2000 Udagawa .................... 277/595
6,089,572 A * 7/2000 Plunkett ..................... 277/592
6,139,025 A   10/2000 Miyaoh ...................... 277/593
6,250,645 B1  6/2001 Udagawa .................... 277/595
6,918,597 B2 * 7/2005 Egloff ....................... 277/594

FOREIGN PATENT DOCUMENTS

| DE | 298 04 534 | | 7/1998 |
| DE | 199 34 825 | | 7/1999 |
| DE | 10029352 A1 | * | 12/2001 |
| EP | 0 470 790 | | 2/1992 |
| JP | 5-32872 | | 4/1993 |
| WO | WO98/28559 | | 7/1998 |

* cited by examiner

*Primary Examiner*—Patricia Engle
*Assistant Examiner*—Gilbert Lee

(57) ABSTRACT

Cylinder head gasket with a metallic gasket plate comprising a combustion chamber opening enclosed by a bead, and a stopper surrounding the opening and delimiting deformation of the bead, the stopper formed by elevations of a gasket sheet metal layer which are obtained by deformation thereof, the stopper is designed such that in sections through the sheet metal layer along circular cylindrical surfaces coaxial with the opening the stopper comprises a row of discrete elevations following one another in a circumferential direction of the opening and corresponding depressions located directly opposite these elevations, and in a plan view of the sheet metal layer in the area of the stopper, the total area occupied by the elevations is at least half of the total area of the stopper, and the shape of the elevations differs from the shape of circular arcs at least partially enclosing the opening.

3 Claims, 9 Drawing Sheets

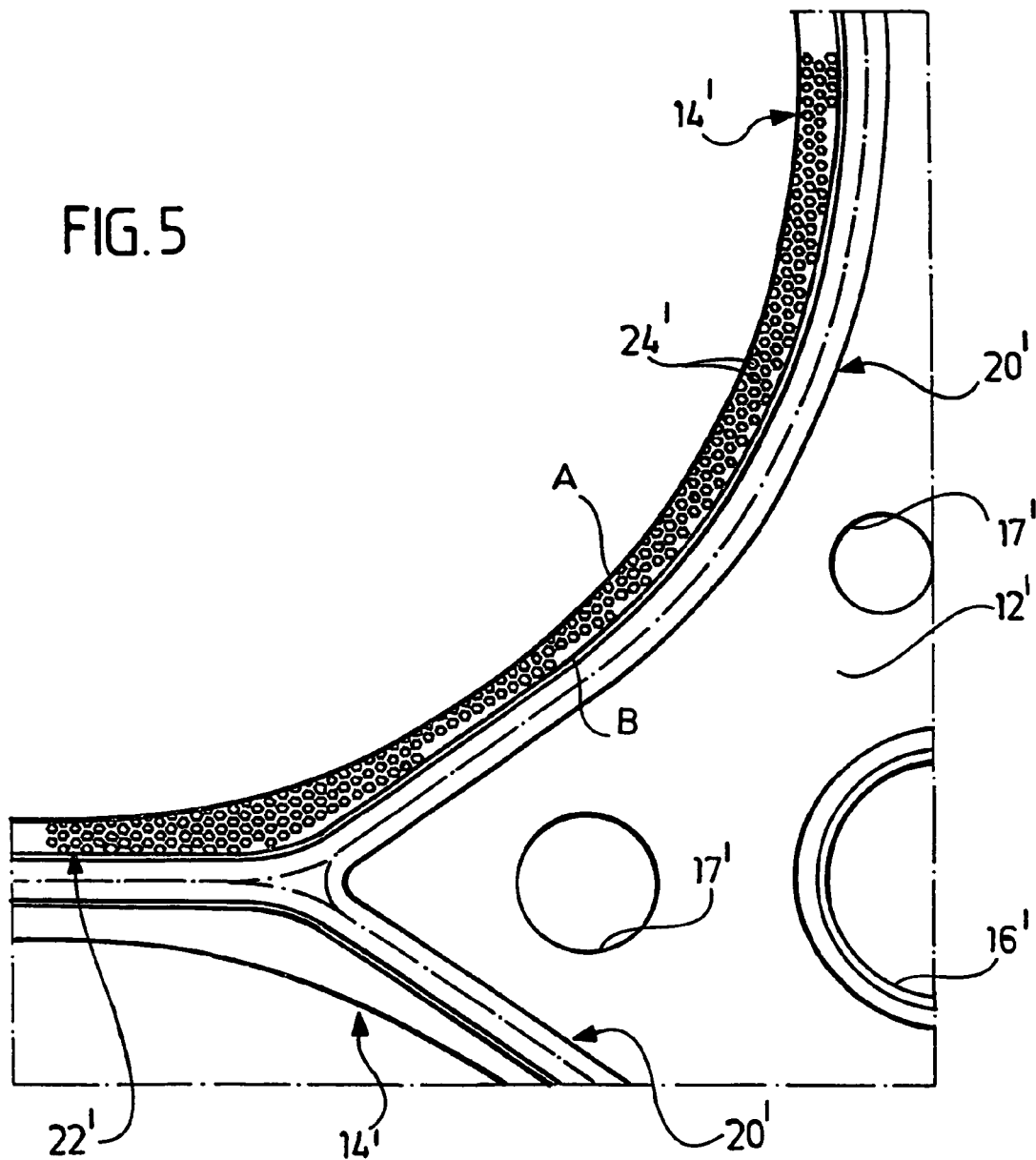

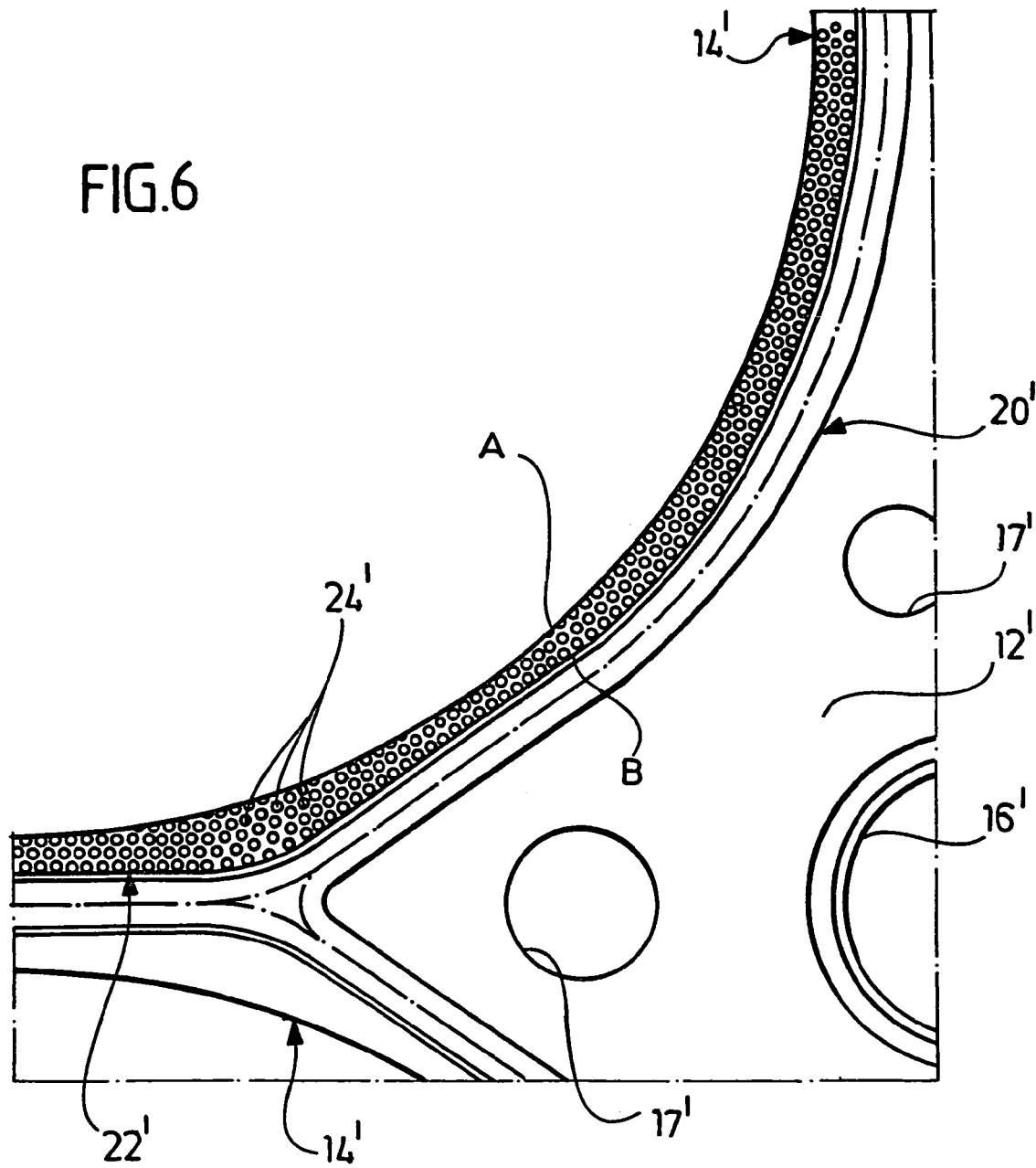

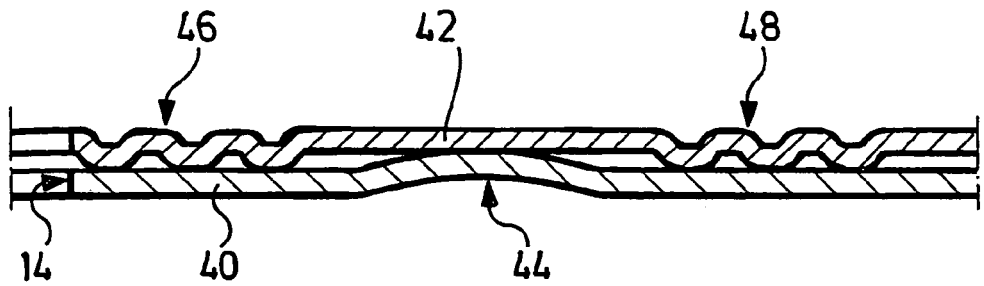
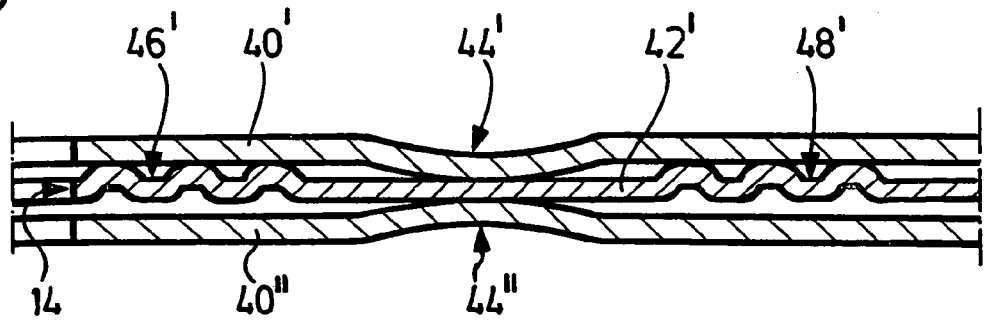
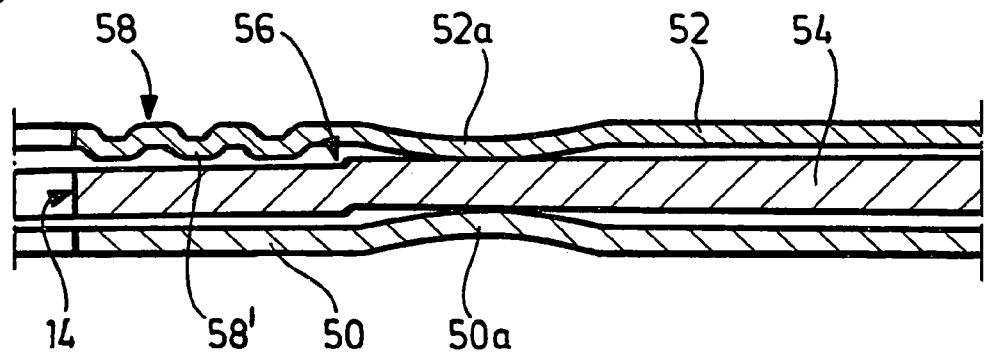
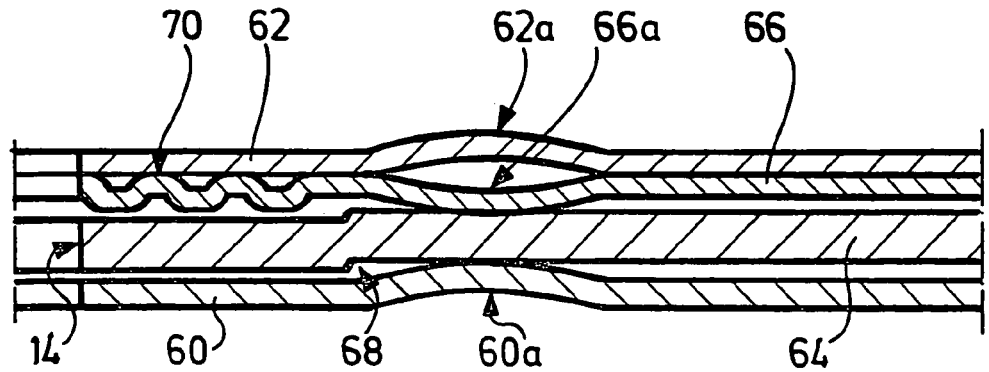

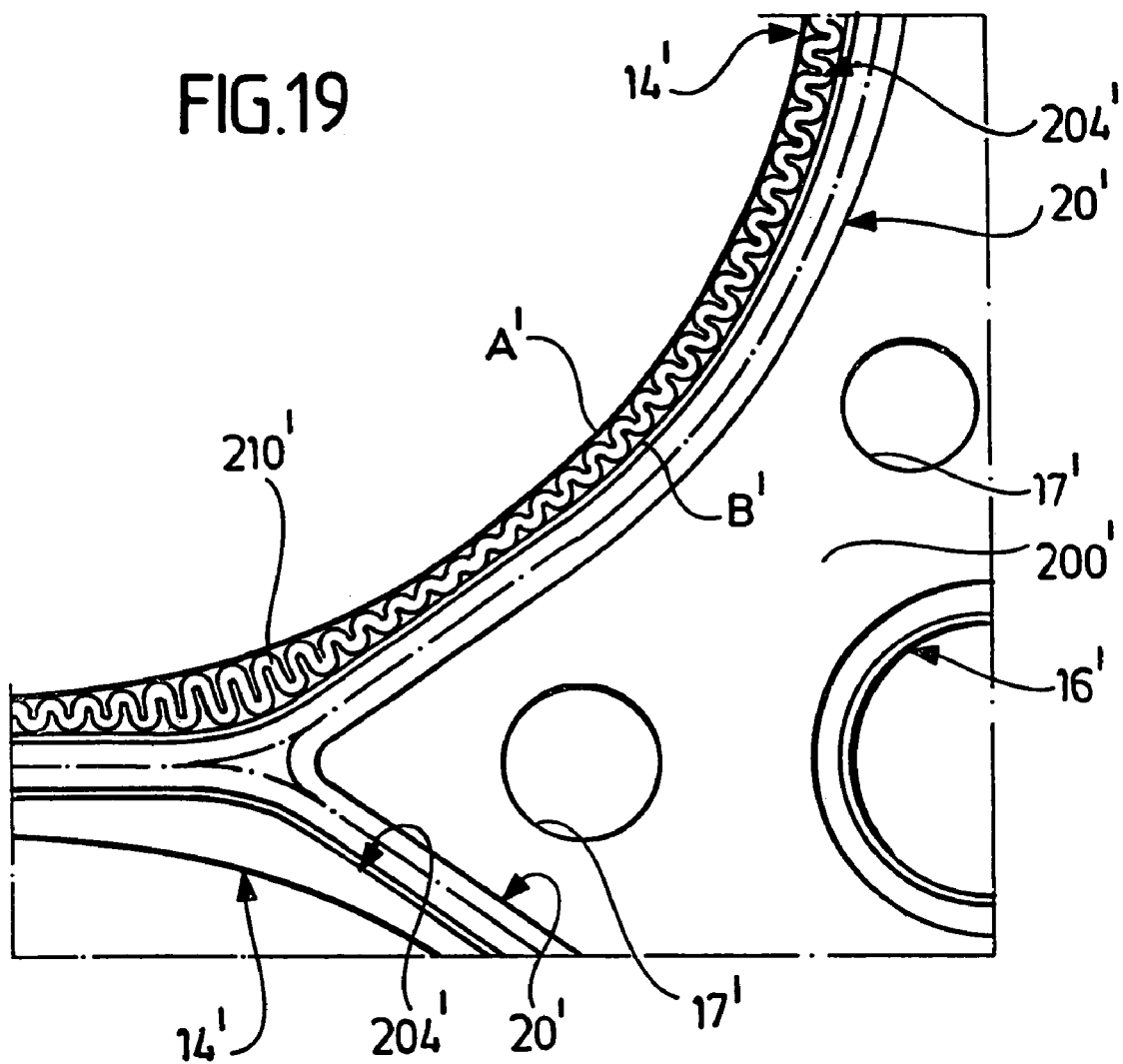

AT LEAST SUBSTANTIALLY METALLIC CYLINDER HEAD GASKET

This application is a continuation of application Ser. No. 10/052,468 filed Jan. 23, 2002, now U.S. Pat. No. 6,769,696.

The present disclosure relates to the subject matter disclosed in German application No. 101 48 295.7 of Sep. 29, 2001, which is incorporated herein by reference in its entirety and for all purposes.

BACKGROUND OF THE INVENTION

The invention relates to a cylinder head gasket with an at least substantially metallic gasket plate comprising at least one combustion chamber opening enclosed by at least one bead elastically deformable in its height, and close to the bead at least one deformation delimiting device (stopper) likewise enclosing the combustion chamber opening and delimiting the bead deformation.

In the case of one-layered or multilayer metallic cylinder head gaskets it has so far been customary, in order to produce a stopper radially inside or outside (with respect to the combustion chamber opening) of the bead carrying out a sealing function, to increase the thickness of a sheet metal layer in an area enclosing the combustion chamber opening in the shape of a circular ring by a flat metallic ring being attached (for example, by welding) to this sheet metal layer or by an edge area of the sheet metal layer surrounding the combustion chamber opening being flanged, i.e., folded over through approximately 180°. Such a stopper has at least almost no elastic properties, and, in most cases, also at least almost no plastic properties, in any case under the pressure forces exerted on the stopper during operation of the engine.

Single-layered or multilayer metallic cylinder head gaskets have recently been proposed (WO 98/28559 and DE-U-298 04 534), wherein the stopper is to a considerable extent plastically and/or elastically, preferably predominantly elastically deformable under the pressure forces acting on the stopper during operation of the engine and is designed in one of the following ways: The sheet metal layer provided with the stopper is provided radially within the bead carrying out the sealing function and requiring protection (with respect to the combustion chamber opening) with one or several beads forming the stopper, enclosing the combustion chamber opening in the shape of a ring and extending concentrically with the combustion chamber opening, and in the event that there are several beads, these can project alternately in one or the other direction of the axis of the combustion chamber opening (see FIGS. 12A and 12B of WO 98/28559). Alternatively, the stopper is formed by a series of ribs and grooves following one another alternately in the radial direction, enclosing the combustion chamber opening in the shape of a ring and being provided on both sides of the sheet metal layer, with the ribs projecting above the two main surfaces of the sheet metal layer and thus resulting in a thickening of the sheet metal layer in the area of the stopper, each rib on the one side of the sheet metal layer having located directly opposite it a rib on the other side of the sheet metal layer (the same then applies to the grooves), and the ribs and grooves having been produced by extrusion of the sheet metal layer (FIG. 12E of WO 98/28559 and DE-U-298 04 534). These stoppers are easier to manufacture than stoppers attached to a sheet metal layer or produced by flanging a sheet metal layer, as it is possible for a sheet metal layer provided with beads to be punched out and provided with the beads with a single tool and for a sheet metal layer to be punched out and provided with the above-described ribs and grooves with a single tool. On the other hand, the recently proposed stoppers have a serious disadvantage:

The fundamental purpose of a stopper is to protect the bead at least mainly carrying out the sealing function against excessive deformations during operation of the engine, a purpose which can only be fulfilled in a highly inadequate way by a stopper which is elastically and/or plastically deformable to a considerable extent during operation of the engine. If the stopper is formed by a bead enclosing the combustion chamber opening in the shape of a circular ring or by several such beads arranged concentrically with each other, the cylinder head gasket clamped between engine block and cylinder head is unable to offer any considerable resistance to the flattening of the beads (not taking into account the stiffness of the beads), as a displacement (in the radial direction with respect to the combustion chamber opening) of the area of the sheet metal layer surrounding the combustion chamber opening, which occurs along with the flattening of the beads forming the stopper, cannot be prevented in these known cylinder head gaskets. These disadvantages also apply to the stopper disclosed in DE-C-199 34 825 consisting of a ring of lugs punched out at three of their sides and bent alternately upwards and downwards out of a sheet metal layer.

The object underlying the invention was to create an at least substantially metallic cylinder head gasket wherein when manufacturing the device for delimiting the deformation (stopper), the attaching of a metal ring or the flanging of a sheet metal layer can likewise be dispensed with, but wherein the device for delimiting the deformation can fulfill its main purpose, namely that of preventing excessive deformation or flattening of a bead mainly carrying out the sealing during operation of the engine better than the above-described known devices for delimiting the deformation consisting of one or several beads or ribs and grooves concentrically enclosing the combustion chamber opening.

SUMMARY OF THE INVENTION

Departing from a cylinder head gasket with such a device for delimiting the deformation, i.e., a cylinder head gasket of the kind mentioned at the outset, wherein the device for delimiting the deformation is formed in a sheet metal layer of the gasket plate by such a deformation of the sheet metal layer that the latter has elevations and depressions in its main surfaces in the area of the device for delimiting the deformation, and the thickness of the device for delimiting the deformation is greater than the original thickness of the undeformed metal sheet of the sheet metal layer, i.e., for example, the thickness of the sheet metal layer in an area of the sheet metal layer bordering directly on the device for delimiting the deformation, this object is accomplished by means of a sheet metal layer provided with the device for delimiting the deformation, which is designed in accordance with the invention, such that in sections through the sheet metal layer along circular cylindrical surfaces coaxial with the combustion chamber opening, the device for delimiting the deformation respectively has a row of discrete elevations following one another in a circumferential direction of the combustion chamber opening and joined to one another in the respective circular cylindrical surface by the sheet metal of the sheet metal layer, and corresponding depressions lying directly opposite these elevations in the sheet metal layer, with the shape of the elevations differing from the shape of circular arcs at least partially enclosing the combustion chamber opening in a plan view of the sheet metal layer, and the total area occupied by the elevations being at least equal to half of the total area of the device for delimiting the deformation and preferably considerably larger than 50% of this total area. The area occupied by an elevation (in a plan view of the sheet metal layer) is to be understood as the total area of all those portions of the sheet metal layer which were deformed when producing the elevation by deforming the sheet metal layer, i.e., which project out of the plane defined by the sheet metal layer prior to its deformation.

The device for delimiting the deformation according to the invention also differs from a modification of the device for delimiting the deformation known from WO 98/28559, which consists of circular-arc-shaped beads which do not extend exactly concentrically with the combustion chamber opening, so that one or several beads immediately adjacent to the combustion chamber opening do not form complete circles—in such a modification the elevations also form circular arcs at least partially enclosing the combustion chamber opening in a plan view of the sheet metal layer.

In a cylinder head gasket according to the invention the said sheet metal layer can be provided on its one main surface only with elevations and on its other main surface only with depressions. Embodiments are, however, also possible wherein both elevations and depressions are provided on each of the two main surfaces of the sheet metal layer, with the depressions on the one main surface lying directly opposite elevations on the other main surface. In any case, each depression corresponds in its shape to the elevation lying opposite it. Furthermore, under a predetermined specific pressure load on the gasket (pressure force per surface unit of the gasket plate) in the ring area of the gasket plate occupied by the stopper and the bead which is to be protected by the stopper, the elastic and/or plastic deformability in the height of the elevations of the stopper should be smaller and preferably less than approximately 50% of the deformability in the height of the bead which is to be protected by the stopper. If one regards the device for delimiting the deformation (stopper) and the bead to be protected by it as each being a spring which is capable of deformation perpendicularly to the plane of the sheet metal layer, then the spring constant (i.e. the hardness) of the device for delimiting the deformation should be greater than that of the bead which is to be protected.

When reference is made hereinabove to the thickness of the device for delimiting the deformation, this thickness is defined by the spacing between the two parallel planes which in the area of the device for delimiting the deformation can be placed against the two sides of the device for delimiting the deformation on either side of the sheet metal layer. The above-mentioned discrete (or single) elevations are, of course, joined to one another by areas of the sheet metal layer, and the base or bottom of an elevation can pass over directly into the base or bottom of a neighboring elevation. Regarding the percentage area of the device for delimiting the deformation which is occupied by the elevations, the percentage areas of all elevations are, of course, to be added, also when they project from both sides of the sheet metal layer (the latter is, so to speak, to be viewed as being transparent when it is a question of determining the percentage area occupied by the elevations).

In the cylinder head gasket according to the invention, the material of the sheet metal layer in the area of the elevations should be cold-worked by deformation up to almost the breaking limit. In other words, under the pressure forces acting on the elevations during operation of the engine, the elevations should be at least almost inelastic and have at least almost no plastic properties.

Differently from the devices for delimiting the deformation according to WO 98/28559 and DE-U-298 04 534, a cylinder head gasket according to the invention is characterized in that in sections through the said sheet metal layer along circular cylindrical surfaces coaxial with the combustion chamber opening, the crests of the elevations to be pressed against a neighboring sealing surface when the gasket is installed form with this sealing surface a contact zone which encloses the combustion chamber opening but is interrupted several times, and, in particular, regularly in a circumferential direction of the combustion chamber opening, and the above-mentioned sealing surface is to be understood as a main surface of another sheet metal layer of the cylinder head gasket or a sealing surface of cylinder head or engine block against which the cylinder head gasket rests.

The inventive device for delimiting the deformation does not necessarily have to surround the combustion chamber opening as a ring-shaped structure closed within itself. In the case of combustion chambers lying very close together, the web lying between two combustion chamber openings in the sheet metal layer may be too narrow to also form the deformation delimiting device in the area of this web.

In order to achieve a particularly high resistance of the deformation delimiting device to deformation, in preferred embodiments of the cylinder head gasket according to the invention, the elevations are approximately rectangular or trapezoidal in cross section and in a plan view of the sheet metal layer preferably border on one another with at least almost no spacing between them. The rectangular or trapezoidal shape of the elevations is preferably achieved by the elevations first being produced with a larger height than their final height and then being flattened off somewhat by reverse deformation. This results in a higher stiffness of the elevations because the proportion of cold-worked zones and the degree of deformation of the sheet metal layer in the area of the elevations are increased.

In a first group of particularly advantageous cylinder head gaskets according to the invention, the device for delimiting the deformation forms in a plan view of the said sheet metal layer a two-dimensional pattern of single discrete elevations, and in a plan view of the sheet metal layer the spacings between neighboring elevations are considerably smaller (in particular, 50% or less) than the maximum diameters of the elevations. The elevations preferably form a regular pattern at least in some areas of the device for delimiting the deformation, but the geometry of the engine block or cylinder head may also necessitate an overall irregular pattern. In order to be able to work with a tool which is as easy to manufacture as possible, when producing the elevations and depressions, it is recommended that all elevations (and thus also all depressions) be of approximately the same design, preferably knob-shaped. A particularly dense "packing" of the elevations and thus a deformation delimiting device which is particularly resistant to deformation are obtained when the elevations form a honeycomb pattern in a plan view of the said sheet metal layer. With a view to obtaining a packing which is as dense as possible, it is also recommendable to provide all elevations on one side of the sheet metal layer.

In the case of multilayer metallic cylinder head gaskets it is known per se to stamp a pattern of knob-shaped elevations in one or several metal layers (EP-A-0 470 790, FIG. 7). On the one hand, however, the sole purpose of these elevations is to minimize the heat transfer between engine block and cylinder head by the metal layers of the cylinder head gasket being kept at spacings from one another also when the cylinder head gasket is installed, and, on the other hand, the spacings between neighboring elevations are larger than the maximum diameters of the elevations, so that such a knob-like pattern does not possess the resistance to deformation that is desired for a device for delimiting the deformation.

In a second group of cylinder head gaskets according to the invention, the sheet metal layer provided with the device for delimiting the deformation is designed such that the elevations are formed by at least one bead which in a plan view of the sheet metal layer surrounds the combustion chamber opening in an almost closed configuration and forms over at least part of its length a meander extending in a circumferential direction of the combustion chamber opening. Such an embodiment makes it possible to form a second sealing location, preferably radially (with respect to the combustion chamber opening) within the bead mainly carrying out the sealing function, as such a device for delimiting the deformation can form with a neighboring sealing surface a closed contact zone around the combustion chamber opening when the bead forming the deformation delimiting device surrounds the combustion chamber opening in closed configuration. At locations where an opening, for example, a combustion chamber or an opening for the passage of cooling water or lubricating oil, lies in the immediate vicinity of a combustion chamber in the engine to be sealed, the bead forming the deformation delimiting device cannot have a meandering course in the area between the combustion chamber and the said opening, but instead, for example, a straight-lined or circular-arc-shaped course. A correspondingly dense "packing" of the meander loops results in a deformation delimiting device which is much more resistant to deformation than the above-described deformation delimiting device according to WO 98/28559 and DE-U-298 04 534, also when the percentage area of the deformation delimiting device occupied by the meandering bead—measured in a plan view of the sheet metal layer—is smaller than half the total area of the deformation delimiting device measured in this plan view. Such meandering beads are thus also to be regarded as falling within the invention.

In a third group of cylinder head gaskets according to the invention, the deformation delimiting device is designed such that in a plan view of the said sheet metal layer the elevations are formed by a ring of beads enclosing the combustion chamber opening, with the beads extending approximately in the radial direction with respect to the combustion chamber opening. With such a bead configuration a flattening of the beads would at least not involve any appreciable radial displacement of the beaded area of the sheet metal layer (in contrast to a deformation delimiting device with one or several beads, each of which encloses the combustion chamber opening in the shape of a ring).

In preferred embodiments of the invention, when producing the elevations and depressions the material of the sheet metal layer is deformed to as great an extent as possible, namely almost as far as the breaking limit, and cold-worked. Steels with a tensile strength of approximately 600 to approximately 1,800 N/mm$^2$, preferably from 700 to 1,700 N/mm$^2$, are suitable for the sheet metal layer provided with the stopper—below that the material would be too soft, a higher tensile strength would impair the deformability. It should be noted that the tensile strength of the starting material need not necessarily lie in this range, but rather the tensile strength of the finished product. The desired hardness may be achieved by a heat treatment following the deformation, however, the desired hardness is preferably achieved by cold-working. Band steel types 1,4310 according to the European standard EN 10088-2 are particularly well suited.

The stopper is preferably produced on a so-called functional layer, i.e., on a spring steel layer in which the bead mainly carrying out the sealing function also is or was produced. In the case of multilayer metallic cylinder head gaskets, however, the stopper can also be provided on another layer, as is disclosed in the prior art on cylinder head gaskets. In the case of a multilayer metallic cylinder head gasket it is recommended not to provide the stopper on one of the outer layers, but on a sheet metal layer lying inside the stack of layers, so as to eliminate the danger of the elevations pressing into the sealing surface of the engine block or the cylinder head, above all, when the cylinder head, as is customary in modern engines, is made of a light metal alloy. It is also for this reason that elevations with flat crests are recommended.

An elevation pattern which is as dense as possible is aimed at (insofar as this permits deformation of the sheet metal layer), so as make the proportion of the total supporting area of the stopper as large as possible. With this in mind, it may also be recommendable to fill the gaps between the crests of the elevations and possibly also the depressions corresponding to the elevations with a filler, in particular, with a casting resin or elastomeric material provided with fillers.

The height of the elevations preferably lies in a range of 5 to 25 hundredth mm, in particular, 5 to 15 hundredth mm. If the elevations are provided in an outer surface of the cylinder head gasket facing the cylinder head, and the cylinder head consists of a light metal alloy, it may, however, be recommendable to make the elevations up to 30 hundredth mm high, in order to take into account any possible embedding of the elevations in the sealing surface of the cylinder head.

Sheet metals with a thickness of 0.10 to 0.50 mm, preferably 0.20 to 0.30 mm, are particularly well-suited for the sheet metal layer provided with the stopper.

Since it is particularly recommendable to produce the elevations and depressions by deep-drawing of the sheet metal, the elevations of preferred embodiments have flanks extending at an incline to the plane of the sheet metal layer, which results in approximately trapezoidal cross sections.

As mentioned above, the aim is for the elevations to have as large a "packing density" as possible. It is, therefore, recommended that the elevations be made as small as possible in a plan view of the sheet metal layer (as small as the selected deformation process permits).

In view of the aim of achieving as large a "packing density" as possible and the limit set by the material for deformation of the sheet metal, embodiments are preferred in which the elevations all point in the same direction, i.e., project from the same main surface of the sheet metal layer. However, embodiments are, of course also possible in which the elevations point, in particular, alternately in both directions.

As mentioned above, in modern engines through-openings for cooling water, oil and the like are often located in the immediate vicinity of a combustion chamber, so that in areas around a combustion chamber opening in a cylinder head gasket there is little space for accommodating a sealing bead and a stopper. The same applies to combustion chamber openings lying close together. This can cause considerable difficulties in the above-described known cylinder head gaskets in which the stopper is formed not only by one but by several concentric beads. In this respect, the invention offers a further advantage when the stopper is formed by a pattern of small knob-like elevations, as it is then readily possible to provide a constricted portion of the knob pattern in such a narrow area of the cylinder head gasket. The ring-shaped band formed by the knob-like pattern can also be designed so as to be variable in its width, i.e., have a width profile, so as to take into account the fluctuations in the specific surface pressure of the gasket around a combustion chamber. The same applies accordingly to embodiments with meandering beads or a ring of beads extending approximately radially.

In comparison with known stoppers consisting of one or several beads, which enclose the combustion chamber opening in the shape of a ring, the invention offers yet a further advantage, in particular, when the stopper is formed by a pattern of knob-like elevations: A bead is supported on neighboring surfaces, on the one hand, only by its line-shaped crest and, on the other hand, only by its two line-shaped bead feet, whereas in a stopper according to the invention the pattern of the supporting surfaces is very much denser so that for this reason alone a stopper according to the invention can offer a much greater resistance to reverse deformation than a stopper consisting of one or several beads enclosing the combustion chamber opening in the shape of a ring.

In cylinder head gaskets according to the invention, the stopper forms in a plan view of the sheet metal layer an area in the form of a band with a width preferably lying between 0.8 and 5 mm, in particular, between 1 and 3.5 mm, which encloses the combustion chamber opening at least almost in the shape of a ring. In this plan view, this band is respectively delimited (radially outwardly and inwardly with respect to the combustion chamber opening) by a continuous line formed by a curve or line curved as little as possible and forming a tangent to the radially outward or inward elevations or elevation portions of the stopper. This is referred to mathematically as envelope or envelope curve or envelope of the elevations. The surface of the band defined by the two envelopes, measured in the plan view, is to be seen as the total surface of the deformation delimiting device.

In particularly advantageous embodiments of the invention, the stopper lies between the bead mainly carrying out the sealing function and the combustion chamber opening (in principle, the stopper or a further stopper could also lie radially outside the said bead), above all, because the bead mainly carrying out the sealing function is then better protected from the high temperatures prevailing in the combustion chamber.

When the stopper disclosed in WO 98/28559 and discussed hereinabove is subjected to pressure and thereby undergoes flattening, the radial displacements of the sheet metal layer with respect to the combustion chamber opening outweigh its displacements in a circumferential direction of the combustion chamber opening, whereas the relations are exactly the reverse in a stopper according to the invention.

However, since radial displacements of the sheet metal layer cannot be totally excluded when stamping or deep-drawing the elevations forming the stopper according to the invention, it is recommended that the final contour of the combustion chamber opening only be punched out after the stopper has been made from the sheet metal layer. It may readily occur that parts of the initially produced stopper are punched on or away so that a stopper consisting of knob-like elevations can have, for example, such punched-on, knob-like elevations, and in the case of a stopper formed by a meandering bead the radially inward loops (U-shaped areas of the meandering bead in a plan view) can be totally or partly missing.

It is known to provide a stopper with a height and/or width varying around a combustion chamber opening, in order to even out the specific surface pressure around a combustion chamber opening. This principle can, of course, also be applied to a stopper according to the invention so that, for example, the height of its elevations varies around the combustion chamber opening.

Further features, advantages and details of the invention will be apparent from the following description and the appended drawings of particularly advantageous embodiments of the cylinder head gasket according to the invention and of a preferred deep-drawing tool for producing a stopper according to the invention by a type of deep-drawing—the invention thus also relates to such a tool and to a process for producing a preferred embodiment of the stopper according to the invention.

BRIEF DESCRIPTION OF THE DRAWINGS

FIGS. 5 and 6 show plan views of an area of cylinder head gaskets according to the invention for a multicylinder engine with stoppers similar to that according to FIGS. 1 to 3;

FIGS. 7 to 16 show sectional illustrations corresponding to FIG. 3 through ten further embodiments of the cylinder head gasket according to the invention;

FIG. 19 shows an illustration, corresponding to FIG. 5, of a variant of the embodiment according to FIG. 17.

DETAILED DESCRIPTION OF THE INVENTION

Figure 1:
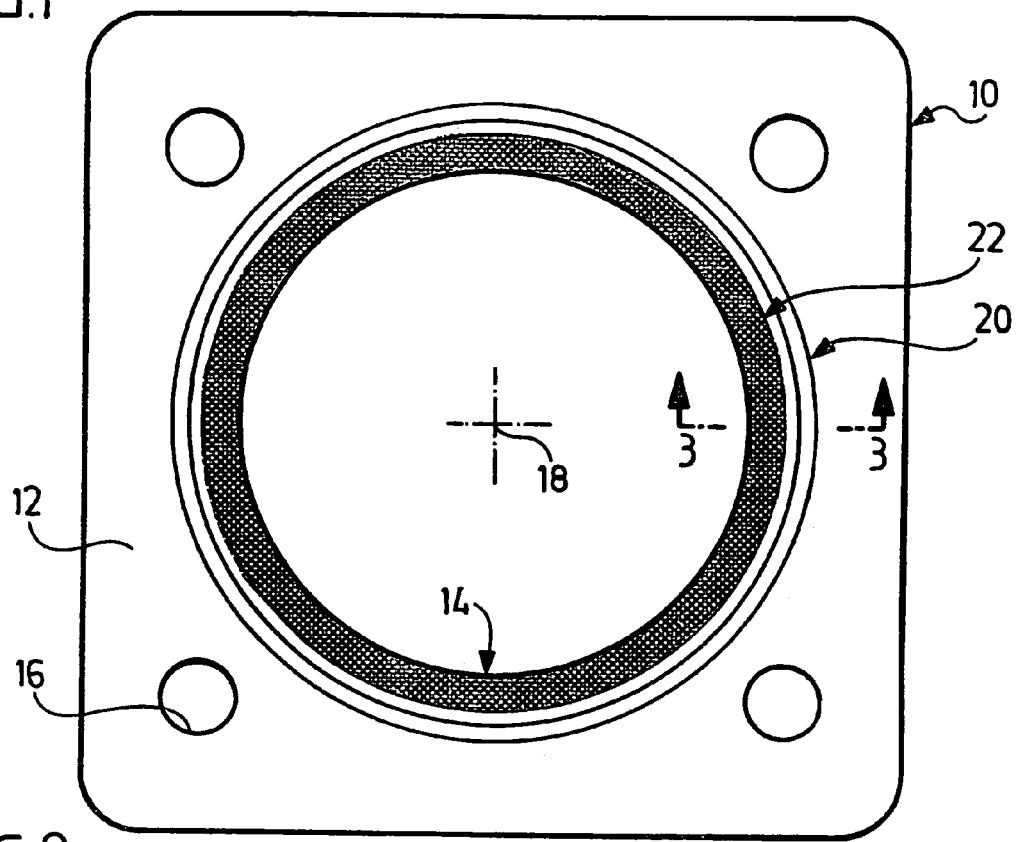
FIG. 1 shows a plan view of a cylinder head gasket according to the invention, which may be a gasket for a single-cylinder engine or a so-called single gasket for a multicylinder engine—in such multicylinder engines with single gaskets a separate cylinder head gasket is provided for each combustion chamber so that several single gaskets lying alongside one another are clamped between engine block and cylinder head.

The cylinder head gasket illustrated in FIG. 1 has a gasket plate 10 consisting of a single sheet metal layer 12 (see also FIG. 3), out of which an at least substantially round combustion chamber opening 14 and screw openings 16 for the passage of cylinder head screws have been punched. The center or axis of the combustion chamber opening 14 is designated 18. The combustion chamber opening 14 or the associated combustion chamber is sealed off to prevent combustion gases from escaping at least substantially by a bead 20 which, in the illustrated case, is a so-called full bead surrounding the combustion chamber opening 14 as a closed circular ring concentric with the combustion chamber axis 18. During operation of the engine, with the gasket installed, the bead must be able to be flattened by elastic deformation in a spring-like fashion perpendicularly to the gasket plate 10. For this reason the sheet metal layer 12 consists of sheet spring steel.

In order that the bead 20 will not be excessively flattened under the influence of the pressure forces generated by the cylinder head screws and the periodically fluctuating pressures occurring during operation of the engine (otherwise cracks might occur in the area of the bead 20 in the sheet metal layer 12 during operation of the engine and the bead might lose the necessary elastic properties), the sheet metal layer 12 has been provided with a device for delimiting the deformation, which, as is customary, will be referred to in the following as stopper and is generally designated 22. In a plan view of the gasket plate 10 or the sheet metal layer 12, the stopper 22 has the shape of a ring-shaped band which encloses the combustion chamber opening 14 and is preferably arranged between the bead 20 and the edge of the combustion chamber opening 14. In the illustrated preferred embodiment, the stopper 22 borders almost directly on the edge of the combustion chamber opening 14.

Figure 2:
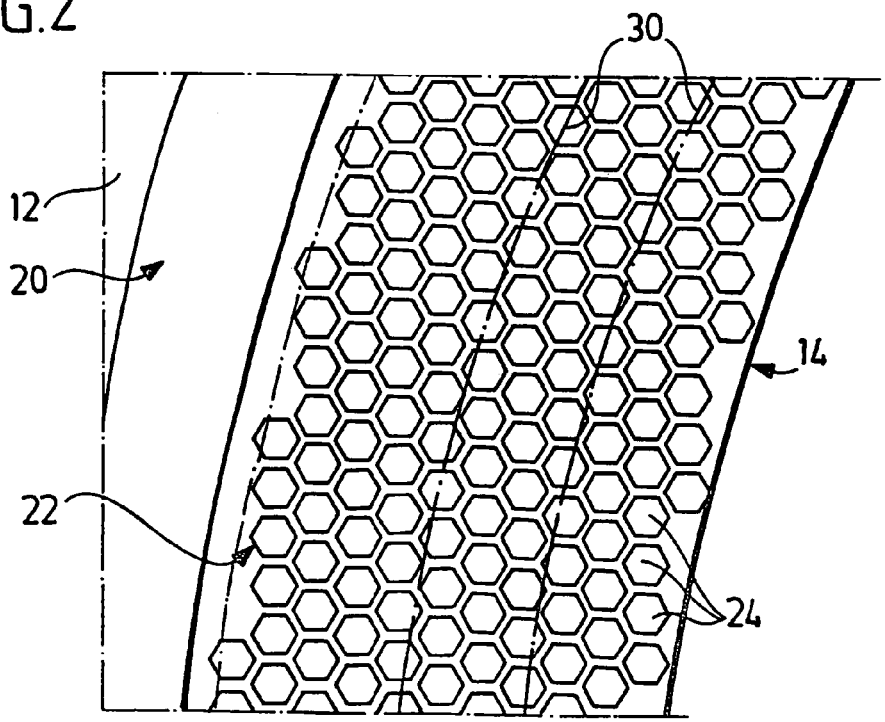
FIG. 2 shows a section from FIG. 1, which illustrates on an enlarged scale an area of the stopper shown in FIG. 1.
Figures 3, 4A, 4B:
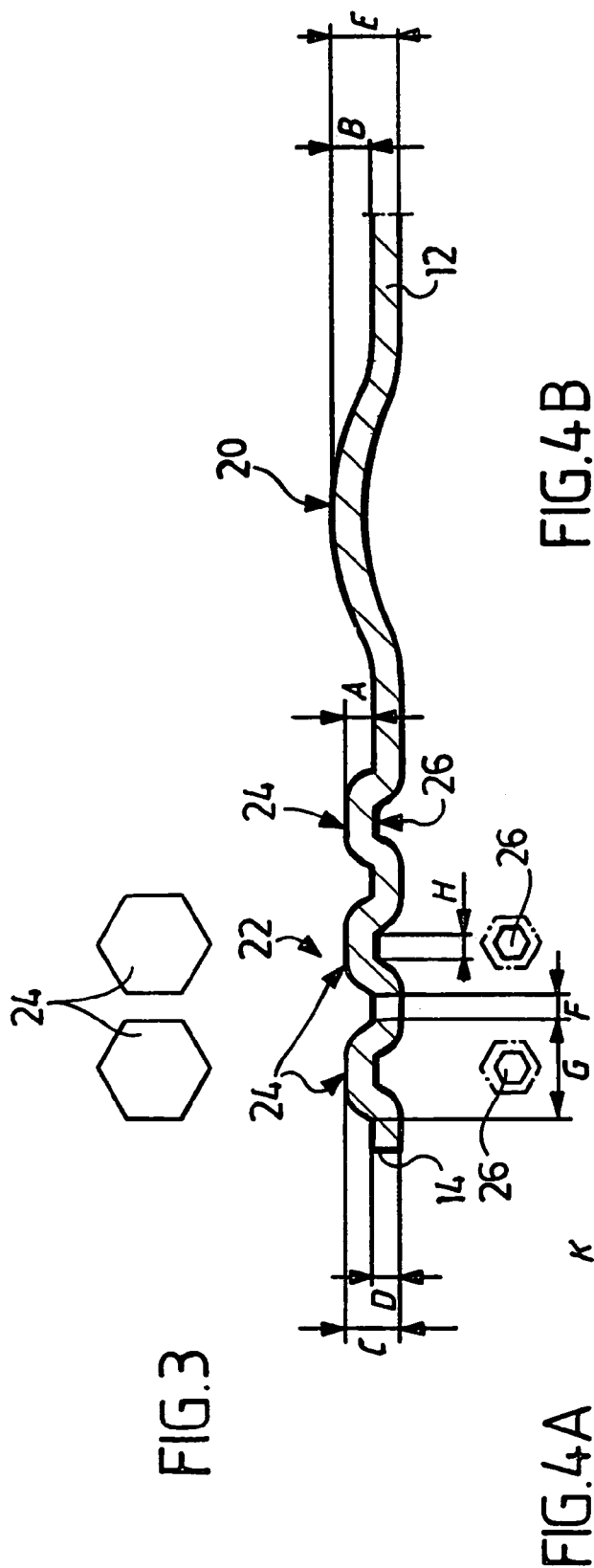
FIG. 3 shows a section along line 3-3 in FIG. 1 together with a plan view of two elevations illustrated in FIG. 3 and a plan view of two depressions recognizable in FIG. 3.
FIG. 4A shows a schematic plan view of a section of an upper part of a deep-drawing tool according to the invention for producing the elevations shown in FIGS. 1 to 3.
FIG. 4B shows a plan view of a corresponding section of a lower part of this deep-drawing tool.

In the embodiment illustrated in FIGS. 1 to 3, the stopper 22 consists of a regular pattern of knob-like elevations 24 all of which have at least approximately the same shape and project from the same side, i.e., the main surface of the sheet metal layer 12. There is located directly opposite each of the elevations 24 a depression 26 whose shape corresponds to the shape of the associated elevation 24. As is apparent from FIG. 2, the elevations 24 form a so-called honeycomb pattern, which ensures the highest "packing density" of the elevations 24, i.e., the largest possible number of elevations per surface unit of the sheet metal layer 12.

As is apparent from FIG. 3, the elevations 24 project above the same main surface of the sheet metal layer 12 as the bead 20, so that the lower side of the sheet metal layer in accordance with FIG. 3 is overall flat, at any rate in the area of the sheet metal layer illustrated in FIG. 3, if one disregards the depressions 26 and the concave side of the bead 20. In this case, the height A of the elevations 24 is smaller than the height B of the bead 20, so that the bead height is elastically reducible, but it is not possible for the bead to be excessively flattened if the resistance of the elevations 24 to deformation, measured in the direction perpendicular to the gasket plate 10 is sufficiently large. It is essential that the total thickness C of the stopper 22 be larger than the thickness D of the sheet metal layer 12 in an area of the sheet metal layer immediately adjacent to the stopper 22, but less than the total thickness E of the deformed sheet metal layer in the area of the bead 20.

In accordance with the invention, in the cutting plane of FIG. 3, in a plan view of the sheet metal layer 12 the maximum diameter G of each elevation 24 is larger, preferably considerably larger than the spacing F between two neighboring elevations 24. The aim is for this spacing F to be as small as possible, namely as small as the deformation properties of the material of the sheet metal layer 12 will still permit. In the case of a sheet spring steel with a sheet thickness of 0.2 mm, the maximum diameter G is, for example, 0.7 mm and the spacing F, for example, 0.2 mm—in this case, the smallest diameter H of each depression 26 is 0.2 mm (measured in the cutting plane of FIG. 3 and seen in a view of the sheet metal layer 12 in accordance with FIG. 3 from below).

As is particularly clear from FIG. 2, the elevations 24 form a regular honeycomb pattern which results in the largest possible "packing density" of the elevations. The depressions 26 then form a corresponding honeycomb pattern (in a view of the sheet metal layer 12 in accordance with FIG. 3 from below).

In sections through the sheet metal layer 12 along circular cylindrical surfaces 30 coaxial with the combustion chamber axis 18, which are indicated by dot-dash-lines in FIG. 2, the stopper 22 forms a row of single discrete elevations 24 following one another in a circumferential direction of the combustion chamber opening 14, and a corresponding row of discrete depressions 26, respectively, and in a plan view of the sheet metal layer the spacing between neighboring elevations is less than the maximum diameter of these elevations. This fundamental feature of the invention is particularly clearly shown in FIG. 2.

In a modification of the embodiment illustrated in FIGS. 1 and 2, the pattern formed by the elevations 24 can also be of such orientation as to obtain rows of elevations 24 following one another in a circumferential direction of the combustion chamber opening 14, with these rows forming circular rings concentric with the combustion chamber axis 18. In this case, in sections through the sheet metal layer 12 along circular cylindrical surfaces 30 coaxial with the combustion chamber opening 14, the spacing between elevations following one another in a circumferential direction of the combustion chamber opening is less than the maximum diameter of the elevations measured in this direction.

As is apparent from FIG. 2, in embodiments with knob-like elevations, the invention can also be defined with respect to the spacings of the elevations from one another by the spacing between neighboring elevations being less than the minimum diameter of the elevations at their base, from which the respective elevation projects from the sheet metal layer, in a plan view of the sheet metal layer.

The tool used for manufacturing the stopper 22 is shown schematically in FIGS. 4A and 4B. This tool is a kind of deep-drawing tool with a tool upper part and a tool lower part, between which the sheet metal layer 12 is inserted, and the two tool parts are then pressed against each other. FIG. 4A shows a section from a plan view of the side of the upper part of the tool facing the lower part of the tool, FIG. 4B a section from a plan view of the side of the lower part of the tool facing the upper part of the tool. Depressions (or openings) 24$a$ forming a regular honeycomb pattern have been machined in the side of the upper part of the tool illustrated in FIG. 4A, while pin-like elevations 26$a$ extending perpendicularly to the drawing plane of FIG. 4B and likewise forming a regular pattern are provided on the side of the lower part of the tool illustrated in FIG. 4B, and the axes of the elevations 26$a$ coincide with the axes of the depressions 24$a$ when the two tool parts are brought together in the direction of these axes, so that the elevations 26$a$ penetrate the depressions 24$a$. Taking into consideration the dimensions indicated hereinabove in conjunction with FIG. 3, the spacings K drawn in FIG. 4A are 0.9 mm. Alternatively, a stopper according to the invention can, however, also be made by processes which work with stamping rolls and are known, for example, by the terms roller deformation and knurling.

FIGS. 5 and 6 show embodiments in which the width of the stopper around the combustion chamber opening varies, only a portion of a single stopper being illustrated in detail in each of the two Figures. In both cases, several combustion chamber openings 14', screw openings 16' and water through-openings 17' are formed in a sheet metal layer 12', and the stoppers 22' according to the invention are formed in both cases by a pattern of knob-like elevations 24'. As the final contours of the combustion chamber openings 14' were punched out after the knob-like elevations 24' were produced by deformation of the sheet metal of the sheet metal layer 12', the stoppers 22' also include elevations 24' which have been partially punched away and are therefore incomplete. In the embodiment according to FIG. 5, the knob-like elevations 24' form a regular pattern, which, as is apparent from FIG. 5, results in gaps in the knob pattern within the stopper 22'. In the embodiment according to FIG. 6, on the other hand, the knob-like elevations 24' form area-wise such an irregular pattern that gaps are thereby avoidable in the knob pattern within the stopper 22'.

The envelopes of the stopper are designated A and B in FIGS. 5 and 6.

Further preferred embodiments of the cylinder head gasket according to the invention will be explained in the following with reference to sectional illustrations corresponding to FIG. 3 in order to show that the invention is also applicable to multilayer cylinder head gaskets and the stopper need not necessarily be provided on that sheet metal layer which comprises that bead or those beads serving mainly to seal around a combustion chamber. In all FIGS. 7 to 16 the combustion chamber opening extending through all layers of the respective cylinder head gasket is again designated 14.

FIG. 7 shows a two-layered cylinder head gasket with two sheet metal layers 40 and 42 arranged on one another. The sheet metal layer 40 is a so-called functional layer consisting of sheet spring steel, in which a bead 44 substantially assuming the sealing function is formed at a radial spacing from the combustion chamber opening 14, while the sheet metal layer 42 is a sheet steel layer which under operating conditions does not have any appreciable elastic or plastic properties at least in the area of two stoppers 46 and 48. The stoppers 46 and 48 correspond to the stopper 22 of the embodiment according to FIGS. 1 to 3, so that no further explanations in this respect are required. The bead 44 projects in the direction towards the sheet metal layer 42, the elevations of the stoppers 46 and 48 in the direction of the sheet metal layer 40. In this embodiment, the bead 44 is supported radially inside and outside (with respect to the combustion chamber opening 14) and thus protected against inadmissibly high deformations during operation of the engine.

The cylinder head gasket illustrated in FIG. 8 is three-layered with two beaded outer layers 40' and 40" and an intermediate layer 42' provided with stoppers 46' and 48'. The intermediate layer 42' corresponds to the sheet metal layer 42 of the embodiment according to FIG. 5, while the outer layers 40' and 40" correspond to the sheet metal layer 40 of the embodiment according to FIG. 7 and are each provided with a bead 44' and 44", respectively. The elevations of the stoppers 46' and 48' all project only in one direction above the one main surface of the intermediate layer 42', but they are able to prevent undesirably high deformations of the two beads 44' and 44" if the total thickness of the stoppers 46' and 48', respectively, is sufficiently large, as the intermediate layer 42' is downwardly bendable radially inside and radially outside the crests of the beads 44' and 44" according to FIG. 8.

FIG. 9 shows a further three-layered cylinder head gasket with two outer layers 50 and 52 serving as functional layers and an intermediate layer 54 which is offset at 56 around the combustion chamber opening 14 in the direction towards the outer layer 50 and radially within a bead 50a, projecting in the direction towards the intermediate layer 54, of the outer layer 50. Consequently, the ring area of the intermediate layer 54 that is radially located within the offset 56 can function as stopper for the bead 50a. The outer layer 52 likewise has a bead 52a which projects in the direction towards the intermediate layer 54 and is located opposite the bead 50a. In addition, the outer layer 52 has radially within the bead 52a a stopper 58 according to the invention, which, with the exception of one difference, corresponds to the stopper 22 of the embodiment according to FIGS. 1 to 3 owing to the offset 56 the elevations 58' of the stopper 58 must be higher than the elevations 24 of the embodiment according to FIGS. 1 to 3 by the amount corresponding to the height of the offset 56, in order that the bead 52a will be protected in the same way against excessive deformations by the stopper 58 as the bead 20 of the embodiment according to FIGS. 1 to 3 by the elevations 24 of the stopper 22.

FIG. 10 shows a four-layered gasket with two outer layers 60 and 62 and two inner or intermediate layers 64 and 66, all the layers except the intermediate layer 64 being provided with a bead 60a, 62a and 66a, respectively, enclosing the combustion chamber opening 14. The intermediate layer 64 is offset at 68 radially within the bead 60a in the direction of the outer layer 60, so that the offset 68 can assume a stopper function for the bead 60a. The intermediate layer 66 is provided radially within the bead 66a with an inventive stopper 70 to which the same is applicable as was said about the stopper 58, as the bead 66a is pressed radially outside the offset 68 against the intermediate layer 64, but the stopper 70 lies radially within the offset 68. Given appropriate dimensioning of the total height of the stopper 70, the latter can also assume a stopper function for the bead 62a of the outer layer 62—the precondition being that in the event of maximum pressing of the cylinder head gasket occurring during operation of the engine, when the radially inner area of the outer layer 60 rests against the radially inner area of the intermediate layer 64, the total thickness of the gasket plate in the area of the stopper 70 has to be of such size that the bead 62a will not be excessively flattened.

Figure 11:
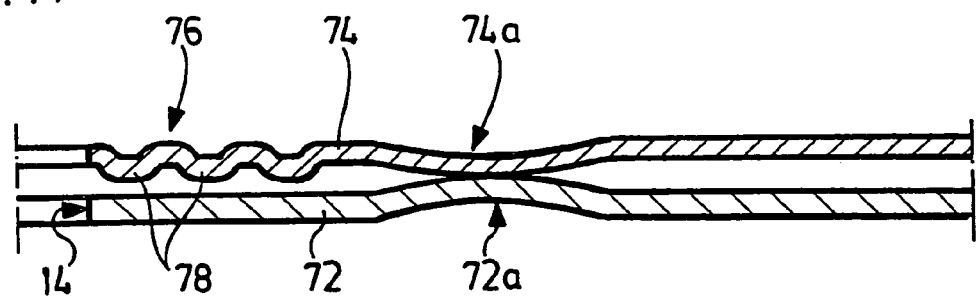

FIG. 11 shows a cylinder head gasket which like the embodiment according to FIG. 7 is two-layered, but each of the two sheet metal layers 72 and 74 of the embodiment according to FIG. 11 is provided with a bead 72a and 74a, respectively, and an inventive stopper 76 provided on the sheet metal layer 74 is designed so as to be able to protect both beads from excessive flattening, for which only a corresponding height of the elevations 78 of the stopper 76 is required.

Figure 12:
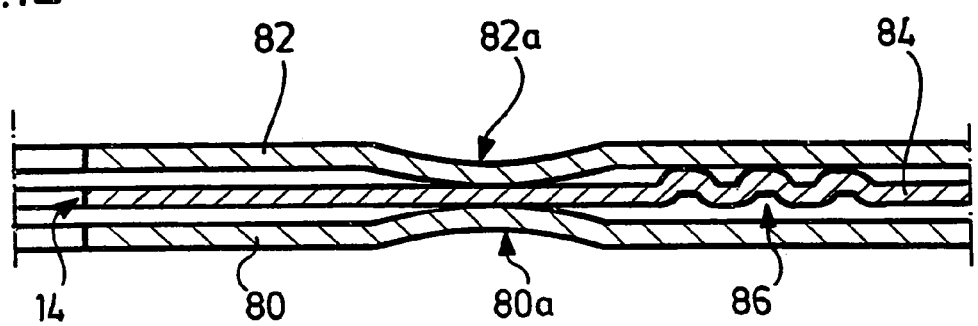

The embodiment illustrated in FIG. 12 serves to show that a stopper according to the invention can also be arranged radially outside of the bead or beads to be protected. This cylinder head gasket has two outer layers 80 and 82 provided with beads 80a and 82a and an intermediate layer 84 with a stopper 86 according to the invention to protect the two beads projecting against the intermediate layer 84. In this embodiment, it may be expedient to design the stopper 86, differently from shown in the drawing, such that it has elevations projecting towards both sides, with neighboring elevations projecting in opposite directions in a plan view of the intermediate layer 84.

Figure 13:
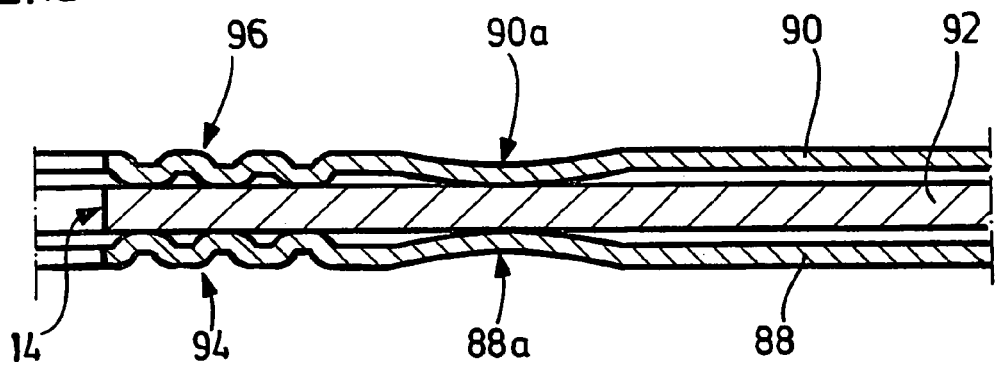

The cylinder head gasket illustrated in FIG. 13 has two outer layers 88 and 90 serving as functional and stopper layers, and a smooth intermediate layer 92, against which beads 88a and 90a of the two outer layers project. Each of the outer layers has radially within its bead an inventive stopper 94 and 96, respectively, whose elevations project in the same direction as the bead of the respective outer layer.

Figure 14:
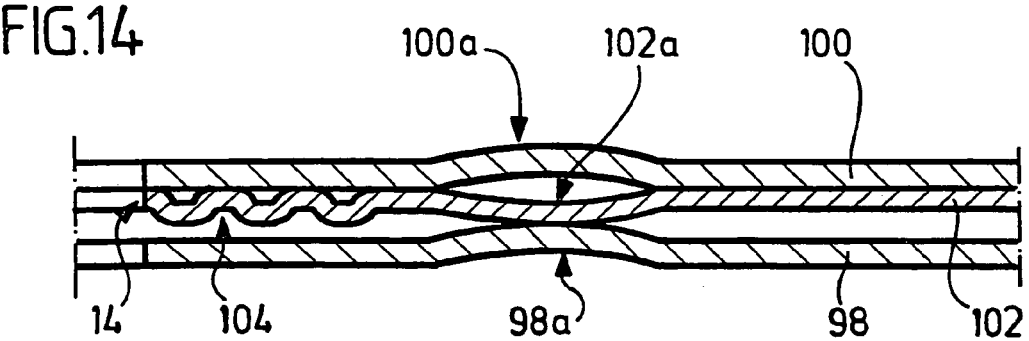

FIG. 14 shows a three-layered cylinder head gasket with three functional layers, namely two outer layers 98 and 100 and an intermediate layer 102, each of which is provided with a bead 98a, 100a and 102a, respectively. The intermediate layer 102 also has radially within the beads a stopper 104 according to the invention. Given appropriate dimensioning of its total thickness and adequate flexibility of the layer 102, the stopper 104 can protect all three beads against excessive flattening.

Figure 15:
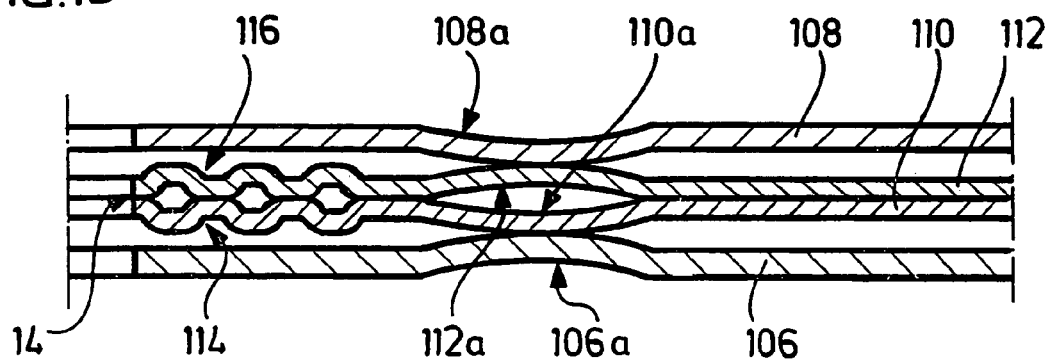

The cylinder head gasket illustrated in FIG. 15 has four layers, two of which are designed as functional layers and two as functional and stopper layers, namely two outer layers 106 and 108 and two intermediate layers 110 and 112, each of which is provided with a bead 106a, 108a, 110a and 112a, respectively. In addition, each of the intermediate layers has radially within the beads an inventive stopper 114 and 116, respectively. If the elevations of the stopper 114 project sufficiently far (downwards in accordance with FIG. 15), they can protect the two beads 106a and 110a against excessive deformations, and the same applies to the stopper 116 and the beads 108a and 112a.

Figure 16:
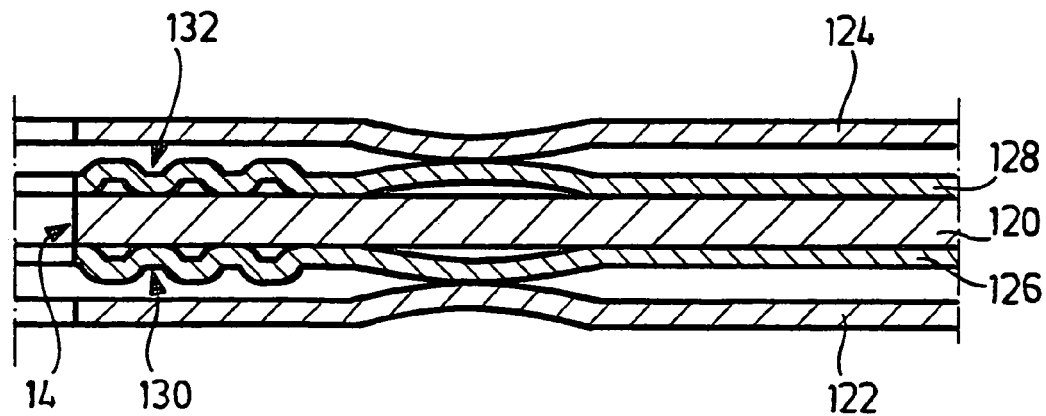

The cylinder head gasket illustrated in FIG. 16 is five-layered and of mirror-symmetrical design with respect to an intermediate layer 120. The intermediate layer 120 is a smooth sheet metal layer, while two outer layers 122 and 124 are beaded functional layers, and two intermediate layers 126 and 128 are beaded functional and stopper layers, whose inventive stoppers are designated 130 and 132. Given appropriate dimensioning of the total thickness of the stoppers 130 and 132, respectively, each of these stoppers can protect the beads of its own and the neighboring sheet metal layer against excessive flattening.

Figure 17:
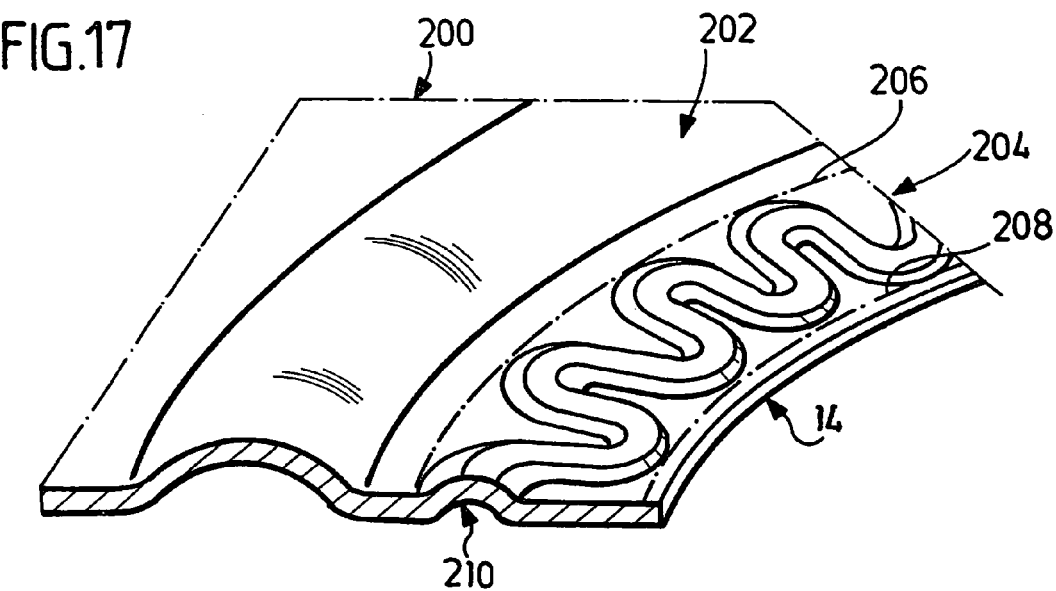
FIGS. 17 and 18 show two further embodiments of a deformation delimiting device according to the invention.
Figure 18:
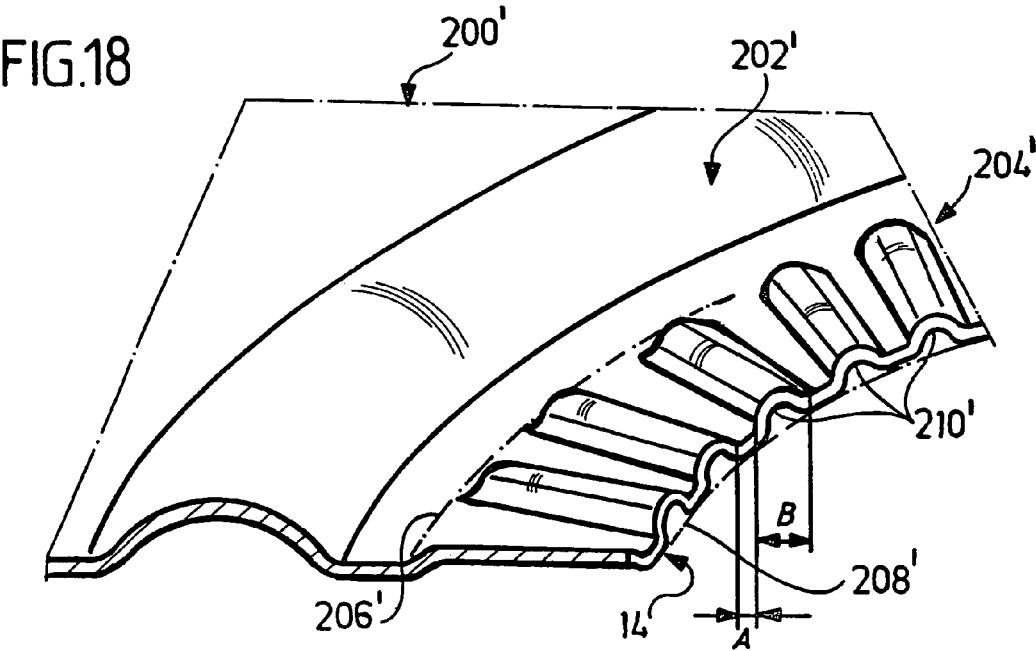

Two further embodiments of the invention are illustrated in FIGS. 17 and 18, which each show in perspective representation a section of a sheet metal layer provided with a stopper according to the invention. The sheet metal layer also has a bead substantially assuming the sealing function, but in a multilayer gasket this bead could also be provided in another sheet metal layer. In both cases, the combustion chamber opening is again designated 14.

In the embodiment according to FIG. 17 the sheet metal layer 200 has radially within the bead 202 substantially assuming the sealing function a stopper 204 which is delimited by dot-dash lines 206 and 208, i.e., the envelopes, which in this case both extend concentrically with the combustion chamber opening 14. In the area of the stopper 204, the sheet metal layer 200 is provided with a meandering bead 210 whose loops are radially oriented with respect to the combustion chamber opening 14 and preferably lie as close together as is permitted by the forming behavior of the material of the sheet metal layer 200. From FIG. 17 it is apparent that also in this embodiment—in a plan view of the sheet metal layer 200 and within the delimiting lines 206, 208—the area occupied by the bead 210 is at least as large as, preferably larger than half the area of the ring-shaped portion of the sheet metal layer 200 delimited by the delimiting lines 206 and 208. In this connection, it is to be noted that when calculating the percentage area of the bead 210 with respect to the total area of the stopper, i.e., the elevations of this stopper 204, in a plan view of the sheet metal layer 200 all portions of the bead 210 must be included, i.e., also the surfaces of the two bead flanks between the bead crest and the undeformed portions of the sheet metal layer 200.

In the embodiment according to FIG. 18, a sheet metal layer 200' provided with a bead 202' has a stopper 204' which is formed by a ring of beads 210' extending radially with respect to the combustion chamber opening 14. As is apparent from FIG. 18, in accordance with the invention the minimum spacing A between two neighboring beads 210' is smaller, preferably considerably smaller than the minimum width B of the beads measured in a plan view of the sheet metal layer 200'. In this connection, it is to be noted that the spacing of the beads from one another in a radial direction with respect to the combustion chamber opening 14 can increase outwardly. Alternatively or additionally, the bead width can increase outwardly in a radial direction. At their radially outer ends, the beads 210' pass with curvatures, i.e., with radii, into a flat area of the sheet metal layer 200' in both a side view of each bead and a plan view of the sheet metal layer (the latter is not clearly apparent from FIG. 18), so that in a plan view of the sheet metal layer the radially outer ends of the beads 210' form approximately a circular arc extending over 180°. The envelopes of the stopper 204' are designated 206' and 208'. If in the embodiment according to FIG. 18 the final contour of the combustion chamber opening 14 is only punched out after the beads 210' have been produced, it should be ensured that, for example, by adequate supporting of the beads in the punching tool, the radially inner ends of the beads do not undergo deformation to a very great extent. On the other hand, when punching out the final contour of the combustion chamber opening 14 of the embodiment according to FIG. 17 the total or partial punching away of the radially inner arcs or loops of the meander formed by the bead 210 could be tolerated.

FIG. 19 shows a variant of the embodiment according to FIG. 17, more particularly, a variant similar to the embodiment according to FIG. 5 or FIG. 6. The envelopes are, therefore, designated A' and B'.

FIG. 19 shows a sheet metal layer 200' with combustion chamber openings 14', screw openings 16', water through-openings 17' and beads 20' which enclose the combustion chamber openings 14', pass over into one another in a web area between two neighboring combustion chamber openings 14' and are to be protected against excessive deformations by stoppers 204' according to the invention. The stopper 204' shown in greater detail is formed by a meandering bead 210' which surrounds the associated combustion chamber opening 14' in closed configuration and varies in its meandering course in such a way that the stopper 204' has a varying width around the combustion chamber opening 14'. The reasons for this width profile can be seen in the following: When openings, such as one of the openings 17', are provided in the immediate vicinity of a combustion chamber opening 14' in the sheet metal layer 200', the confined spatial conditions can make constriction of the stopper 204' necessary. On the other hand, it may be recommendable to widen the stoppers 204' in areas where two beads 20' pass over into each other in the web area between two neighboring combustion chamber openings 14' and form a Y-shaped configuration.

As is apparent from the above, each inventive stopper has in a plan view of the sheet metal layer a plurality of small radii, in the region of which the material of the sheet metal layer is cold-worked, i.e., the percentage area of the cold-worked portions is a great deal larger in a stopper according to the invention than in a stopper according to WO 98/28559. This is expressed in the sum of the arc angles of these radii of a stopper seen in a plan view. In the case of the above-described known stoppers disclosed in WO 98/28559 and in DE-U-298 04 534, the sum of the arc angles is 360° multiplied by the number of circular beads, whereas the sums of the arc angles in the stoppers according to the invention are calculated as follows: If the stopper is formed by a pattern of knob-like elevations, the sum of the arc angles is 360° multiplied by the number of knobs; if the stopper has a bead surrounding the combustion chamber opening in an at least almost closed configuration and having a meandering course over at least part of its length, the sum of the arc angles is twice 180° multiplied by the number of loops of the meander; and if the stopper is formed by a ring of radially extending beads, the sum of the arc angles is 180° multiplied by the number of beads.

The invention claimed is:

1. A cylinder head gasket with a gasket plate being at least substantially metallic, said gasket plate comprising one or several sheet metal layers and having several combustion chamber openings, each of said combustion chamber openings having at least one first bead associated therewith and being surrounded by said at least one first bead formed in a sheet metal layer of said one or several sheet metal layers and having a spring rate so as to be elastically deformable in height, wherein for delimiting the elastic deformation of said first bead at least one delimiting device is associated with each of said first beads, said delimiting device being close to the respective first bead, surrounding the respective combustion chamber opening and being obtained by deformation of the sheet metal layer or another sheet metal layer of said one or several sheet metal layers such that (a) said delimiting device is formed by at least one second bead of said deformed sheet metal layer, said second bead having a spring rate and, in a plan view of said deformed sheet metal layer, surrounding the associated combustion chamber opening substantially completely and forming over at least part of the length of said second bead a substantially complete meander extending in a circumferential direction of said combustion chamber opening;

(b) all around the respective combustion chamber opening the spring rate of the second bead is greater than the spring rate of the associated first bead when measured perpendicularly to said gasket plate;

(c) in plan view of said gasket plate, the second bead is disposed between the associated combustion chamber opening and the associated first bead;

(d) the height of the second bead is selected so as to allow an elastic deformation of the associated first bead; and (e) in a plan view of the deformed sheet metal layer the total area occupied by the second bead is at least equal to half of the total area occupied by said delimiting device.

2. The cylinder head gasket of claim 1 wherein the second bead is obtained by such a deformation of said deformed sheet metal layer that a thickness of material of a portion of said layer forming the second bead is substantially the same as a thickness of material of the deformed layer adjacent said second bead.

3. The cylinder head gasket of claim 1 wherein the height of the second bead is selected such that when the gasket is tightened, the first bead is initially compressed without compression of the second bead.

* * * * *